US008874307B2

(12) United States Patent
Behr et al.

(10) Patent No.: US 8,874,307 B2
(45) Date of Patent: Oct. 28, 2014

(54) DEVICE AND METHOD FOR DETERMINING THE STATE OF AGEING OF A HYDRAULIC FLUID OF A HYDRAULIC SYSTEM OF A VEHICLE

(71) Applicant: Airbus Operations GmbH, Hamburg (DE)

(72) Inventors: Robert Behr, Bremen (DE); Volker Baumbach, Ritterhude (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/654,598

(22) Filed: Oct. 18, 2012

(65) Prior Publication Data

US 2013/0096770 A1 Apr. 18, 2013

Related U.S. Application Data

(63) Continuation of application No. PCT/EP2011/056316, filed on Apr. 20, 2011.

(60) Provisional application No. 61/325,909, filed on Apr. 20, 2010.

(30) Foreign Application Priority Data

Apr. 20, 2010 (DE) ......................... 10 2010 015 636

(51) Int. Cl.
*G01M 17/00* (2006.01)
*G06F 7/00* (2006.01)
*G06F 19/00* (2011.01)

(52) U.S. Cl.
USPC ........................... 701/32.1; 701/103; 701/120

(58) Field of Classification Search
CPC ............. G06F 7/00; G06F 19/00; B28B 7/24; B28B 17/00; G01N 11/00; G01N 11/08; G01N 21/31; G01N 21/78
USPC .......... 701/31.4, 29, 32.1; 95/248; 210/195.1; 340/457.4, 525; 324/321; 137/266; 73/6, 708, 716, 53.05, 1.02, 74.56, 73/64.56, 53.01; 60/413; 417/32, 390; 244/50; 702/28, 177
See application file for complete search history.

(56) References Cited

U.S. PATENT DOCUMENTS 3,999,435 A * 12/1976 Siegel ............................. 73/708
4,223,302 A * 9/1980 Hocking ....................... 340/525
(Continued)

FOREIGN PATENT DOCUMENTS

FR 2736720 A1 1/1997
JP 2006322587 A 11/2006

OTHER PUBLICATIONS

W.D Phillips,The high-temperature degradation of hydraulic oils and fluids 2006, John Wiley & Sons, Ltd, Journal of Synthetic Lubrication, J. Synthetic Lubrication 2006; 23: 39-70.*

(Continued)

*Primary Examiner* — Calvin Cheung
*Assistant Examiner* — Luis A Martinez Borrero
(74) *Attorney, Agent, or Firm* — Ingrassia Fisher & Lorenz, P.C.

(57) ABSTRACT

A device for determining ageing of a hydraulic fluid in a hydraulic system with a multitude of hydraulic components is provided. The device comprises at least one temperature determination device and at least one ageing determination device, wherein the temperature determination device determines the respective temperature of each discrete fluid volume of the hydraulic fluid in the hydraulic system, and from the aforesaid the ageing determination device determines an increase in ageing. Generally, the temperature determination device carries out a numerical thermal simulation of the hydraulic system, component by component, including determining at least one temperature of at least one hydraulic component of the hydraulic system, which simulation is supported by measuring the temperatures of individual hydraulic components by means of temperature sensors.

18 Claims, 6 Drawing Sheets

(56) References Cited

U.S. PATENT DOCUMENTS

| | | | | |
|---|---|---|---|---|
| 5,314,613 | A | 5/1994 | Russo | |
| 5,858,070 | A * | 1/1999 | Halm et al. | 95/248 |
| 6,049,381 | A * | 4/2000 | Reintjes et al. | 356/335 |
| 6,912,479 | B2 | 6/2005 | Ryu et al. | |
| 6,972,089 | B2 * | 12/2005 | Leathers | 210/195.1 |
| 7,104,116 | B2 * | 9/2006 | Discenzo | 73/54.28 |
| 7,131,136 | B2 * | 10/2006 | Monroe | 725/105 |
| 7,266,472 | B2 * | 9/2007 | Neumann et al. | 702/177 |
| 7,433,770 | B2 | 10/2008 | Inagawa et al. | |
| 7,581,434 | B1 * | 9/2009 | Discenzo et al. | 73/53.01 |
| 7,793,681 | B2 * | 9/2010 | Apostolides | 137/266 |
| 8,125,224 | B2 * | 2/2012 | White et al. | 324/316 |
| 8,311,858 | B2 * | 11/2012 | Everett et al. | 705/4 |
| 8,484,962 | B2 | 7/2013 | Behr et al. | |
| 8,600,932 | B2 * | 12/2013 | Poling et al. | 707/609 |
| 2005/0066711 | A1 * | 3/2005 | Discenzo | 73/64.56 |
| 2006/0169033 | A1 * | 8/2006 | Discenzo | 73/64.56 |
| 2007/0100518 | A1 * | 5/2007 | Cooper | 701/29 |
| 2007/0222573 | A1 * | 9/2007 | Navarro et al. | 340/457.4 |
| 2007/0245811 | A1 * | 10/2007 | Discenzo | 73/53.05 |
| 2008/0279700 | A1 * | 11/2008 | Anderson et al. | 417/390 |
| 2008/0304976 | A1 * | 12/2008 | Durtschi | 417/32 |
| 2009/0173066 | A1 * | 7/2009 | Duray | 60/413 |
| 2010/0083730 | A1 * | 4/2010 | Le et al. | 73/1.02 |
| 2010/0211329 | A1 * | 8/2010 | Farquharson et al. | 702/28 |
| 2010/0307230 | A1 * | 12/2010 | Gilch et al. | 73/114.55 |
| 2012/0138734 | A1 * | 6/2012 | Hissong | 244/50 |

OTHER PUBLICATIONS

International Searching Authority, Written Opinion for International Application No. PCT/EP2011/056316 dated Oct. 20, 2012.

German Patent Office, German Office Action for German Patent Application No. 102010015636.1, dated Mar. 29, 2011.

Airbus, NSA 307110 Technical Specification, Fluid-Hydraulic Phosphate Ester-Base Fire Resistant, pp. 1-53, Issue N, Mar. 11, 2010.

Boeing, Fire Resistant Hydraulic Fluid Harmonized Requirements, Proposed BMS3-11 Revision, Draft, pp. 1-39, Jul. 26, 2002.

SAE International, Aerospace Standard SAE-AS1241, Fire Resistant Phosphate Ester Hydraulic Fluid for Aircraft, Revision C, pp. 1-33, Issued Mar. 1974, Revised Sep. 1997, Warrendale, PA.

International Searching Authority, International Search Report dated Oct. 7, 2011 for International Application No. PCT/EP2011/056316.

State Intellectual Property Office of the People's Republic of China, Office Action in Chinese Patent Application No. 201180020313.8, mailed Jun. 25, 2014.

* cited by examiner

DEVICE AND METHOD FOR DETERMINING THE STATE OF AGEING OF A HYDRAULIC FLUID OF A HYDRAULIC SYSTEM OF A VEHICLE

CROSS-REFERENCE TO RELATED APPLICATIONS

This is a continuation of International Application No. PCT/EP2011/056316, filed Apr. 20, 2011, which application claims the priority to U.S. Provisional Patent Application No. 61/325,909, filed on Apr. 20, 2010 and to German Patent Application No. 10 2010 015 636.1, filed on Apr. 20, 2010, which are hereby incorporated by reference in their entirety.

TECHNICAL FIELD

The technical field relates to a device and a method for determining the state of ageing of a hydraulic fluid of a hydraulic system of a vehicle.

BACKGROUND

As part of the ongoing development of commercial aircraft and other vehicles that are becoming increasingly more complex, there is an endeavor to continuously improve both operability and reliability. In order to ensure this, for example, for commercial aircraft to be used in the future, improvements in maintainability and the reduction in maintenance costs are generally relevant. In this context an important step could relate to the possibility of carrying out even unscheduled maintenance work quickly and in an uncomplicated manner.

As an energy transmission system or power transmission system for operating actuators, landing gear, brakes and doors or flaps of a commercial aircraft, a hydraulic system depends on the quality and the state of a hydraulic fluid used, because said hydraulic fluid establishes the mechanical connection between the energy source in the form of hydraulic pumps or other means and the consumers. In the assumption that the service life of a hydraulic fluid may extend to a large part of the intended aircraft service life or could even exceed the aforesaid, provisions must be made that can ensure the quality of the hydraulic fluid.

In the case of hydraulics fluids based on phosphate ester, which are at present commercially available, the water content comprises a significant factor influencing the state of the hydraulic fluid. Under the influence of increased temperatures the water content accelerates ageing of the hydraulic fluid as a result of an increased acid content. When the hydraulic fluid reaches the end of its service life, required physical characteristics may no longer meet system requirements. If this is the case, replacement of the hydraulic fluid is the logical consequence. Influencing the hydraulic fluid as a result of impurities such as particles or suspended solids can be eliminated by filtering so that in this case it does not become necessary to change the entire fluid.

In order to always be able to make a reliable statement relating to the quality and the state of ageing of hydraulic fluids, samples are regularly taken from a respective hydraulic system, for example in aircraft at each second C-check. More detailed information can usually be found in a maintenance manual for the particular aircraft type.

DE 196 19 028 C2 and U.S. Pat. No. 5,858,070 A show a device for cleaning a hydraulic fluid by means of a flinger disc arrangement so that the provision of an exchange quantity of hydraulic fluid may be omitted. Other objects, desirable features and characteristics will become apparent from the subsequent summary and detailed description, and the appended claims, taken in conjunction with the accompanying drawings and this background.

SUMMARY

In order to be able to determine the quality of the hydraulic fluid even between two maintenance procedures, with the provisions of the state of the art additional measures would be necessary.

Accordingly, according to various aspects of the present disclosure, provided is a device by means of which the quality and the state of ageing of a hydraulic fluid of a hydraulic system of a vehicle may be determined quickly and in an uncomplicated manner even outside maintenance work.

According to other exemplary embodiments of the present disclosure, provided is a device that is able to determine in situ the quality and the state of ageing of a hydraulic fluid of a hydraulic system of a vehicle.

According to additional exemplary embodiments, provided is a method that may be used for the uncomplicated and quick determination of the quality and the state of ageing of the hydraulic fluid of a hydraulic system of an aircraft.

An exemplary embodiment of the present disclosure comprises at least one ageing determination device and a temperature determination device that is designed to determine the respective temperature of each discrete fluid volume in the hydraulic system. The ageing determination device is designed, from the size and the temperature of a respective discrete fluid volume and from a specified observation period, to determine a specific increase in ageing. Finally, the calculation unit is designed, from the information relating to the respective increases in ageing of the discrete fluid volumes over a predetermined duration, to determine the entire increase in ageing of the hydraulic fluid contained in the hydraulic system.

In order to present these characteristics that are significant in the context of the present disclosure, below at first basic correlations between the temperature, the observation period and the ageing of the hydraulic fluids are stated.

For hydraulic systems of customarily used commercial aircraft, frequently hydraulic fluids on a phosphate ester base are used. These hydraulic fluids are generally-speaking designed according to SAE AS1241, NSA 307110 and BMS 11-3 specifications. At present, two types of hydraulic fluid (types IV and V) are commercially available, whose density and viscosity may differ. According to the above specifications these fluids may, furthermore, be mixed at any ratio. For this reason the expected service life of a hydraulic fluid is normally not identical to the expected service life of an original hydraulic fluid of type IV or V. Equally, this also ensures that the hydraulic fluid that has the shortest expected service life determines the minimum service life.

In general aviation, for hydraulic fluids a mixture of oils based on alkyl phosphate ester and aryl phosphate ester is used. An ester is a reaction product of an acid and an alcohol or of a phenol. In this case the acid section of the molecule originates from a phosphoric acid and provides the ester with fire resistance characteristics. The alcohol/phenol section of the phosphate ester provides the hydraulic fluid with its desired flow characteristics.

Alkyl phosphate esters are made from alcohols. One example is tributyl phosphate, in which 3 butyl alcohols surround the phosphate group. Aryl phosphate esters comprise phenol or alkyl phenols. The R-group may be hydrogen, isopropyl, tert-butyl etc. Dibutylphenyl phosphate is one example of a mixed alkyl/aryl phosphate.

Each of these components comprises a different level of resistance to chemical reactions that result in ageing of the hydraulic fluid under consideration. The hydraulic fluid of an aircraft hydraulic system might have to be changed when impurities as a result of solid particles, suspended solids and/or other liquids, for example water, engine oil, oil from a strut, or cleaning fluid occur. The hydraulic fluid might also have to be changed if it has aged to a certain degree that may result in damage to the hydraulic system in terms of the material and the components.

Three significant mechanisms that result in ageing of hydraulic fluid are known. The production of acid phosphates (phosphoric acid derivatives) is a common criterion providing a measure for a remaining service life to be expected. The three mechanisms are the following:

1. Pyrolysis: above 150° C. alkyl groups detach from the phosphate ester in order to form unsaturated hydrocarbons that result in an acid derivative.
2. Oxidation: oxidation is normally not a significant factor in the ageing of a hydraulic fluid, for example, of an aircraft hydraulic fluid, because the latter is at first quite resistant to oxidation, and furthermore hydraulic systems are usually hermetically sealed.
3. Hydrolysis: in conjunction with increased temperatures, water results in a hydrolysis process to form acid.

The resulting acid may attack elastomers, metallic components and lines and subjects them to ageing. For this reason, hydraulic fluids are predestined for ongoing monitoring, even between specified maintenance intervals.

While the ester component of this type of fluid is made from a phosphoric acid and an organic alcohol with the separation of water, during the production process water is removed from the reaction process in order to maintain the equilibrium of the functional ester groups. This fact renders the hydraulic fluid sensitive to water accumulation, followed by hydrolysis. For this reason most manufacturers of hydraulic fluid specify a maximum water content of about 0.8%, which is sometimes, however, reduced to about 0.5% because such a water content in conjunction with generally high temperatures may result in increased acid formation. The level of phosphoric acid is stated by means of a so-called neutralization number, abbreviated "NN", which is also stated as a total acid number, abbreviated "TAN". In order to neutralize phosphoric acids in hydraulic fluids, often additives are admixed to hydraulic fluids, which additives have, however, a tendency to reduce the expected service life.

Generally speaking it can be said that with a decreasing water content the expected service life of a hydraulic fluid is prolonged; the same applies with a decreasing chlorine content. However, with increased temperatures the expected service life is shortened.

Generally speaking it is furthermore assumed that the process of ageing of a hydraulic fluid is an accumulative process. This means that at any temperature a discrete fluid volume for a defined time is subjected to nominal ageing that correlates to the maximum expected service life at the particular temperature. In complex hydraulic systems, as is the case, for example, in larger commercial aircraft, very long pipe arrangements with different diameters, different hydraulic performance and different temperature zones are used within the particular aircraft, which are to be taken into account when determining ageing. As long as the entire hydraulic volume is limited, each discrete fluid volume is subjected to different temperatures for various periods during a flight mission.

So-called ageing D can thus be determined by means of the following equation:

$$D = \frac{1}{V}\sum_{k,m} \frac{\Delta t_m V_k}{L_{max}(T_{k,m})},$$

wherein $L_{max}$ denotes the maximum service life of the hydraulic fluid at the temperature $T_{k,m}$; $\Delta t_m$ denotes an observation period; and $V_k$ denotes one of a total of m discrete fluid volumes. Ageing D expresses the portion of the expected service life of the hydraulic fluid so that with D=1, in other words 100%, the expected service life has already been reached.

Thus, according to the present disclosure a hydraulic system may be segmented into several hydraulic components, each by itself comprising a finite hydraulic volume. For calculating ageing of the respective finite fluid volume in the respective component during an observation period it is necessary to determine the temperature of this discrete fluid volume in the respective hydraulic component in order to subsequently determine an increase in ageing of the respective fluid volume. With a known size of the discrete fluid volume, determining the temperature of the discrete fluid volume within the observation period is necessary.

According to an exemplary embodiment, the temperature determination device is adapted for carrying out numerical thermal simulation of the hydraulic system, component by component. Based on the respective design and characteristics for each individual hydraulic component, this may include determining a heat flow that taking into account the ambient temperature of the particular hydraulic component can lead to the determination of a resulting temperature of the discrete fluid volume. The heat flow may comprise both an increase in heat and a decrease in heat. Heat sources of a system may, for example, be caused by performance losses or pressure losses in hydraulic components. A heat loss may, for example, result from heat conduction, heat transfer or heat radiation. The thermal simulation module of the hydraulic system, which simulation module is used for determining the individual temperatures comprises a simulation block for each significant component. Hydraulic components that contain generally a very insignificant part of the hydraulic fluid may sometimes be neglected for determining ageing of the hydraulic fluid.

It is the objective of the device according to the present disclosure to reproduce the thermal interrelationships of the closed hydraulic system, which is to be monitored, by means of numerical simulation carried out on a component-by-component basis in such a manner that the temperatures of the significant hydraulic components that accommodate non-negligible quantities of the entire hydraulic fluid may be determined with sufficient accuracy.

According to an exemplary embodiment of the device according to the present disclosure, the temperature determination device comprises an interface to a control unit of the actual hydraulic system, through which all the actually carried out control procedures are mapped in the numeric simulation of the hydraulic system so that the resulting thermal flows and the resulting temperatures of the individual hydraulic components become determinable.

According to an exemplary embodiment of the device according to the present disclosure, the interface of the temperature determination device is adapted for acquiring the ambient temperature of at least one hydraulic component. This may be accomplished, for example, by a temperature sensor installed in a space that accommodates significant components of the hydraulic system.

According to an exemplary embodiment of the device according to the present disclosure, the temperature determination device is connected to at least one temperature sensor that acquires the temperature of the hydraulic fluid in a respective hydraulic component. Based on the numeric thermal simulation model of the hydraulic system, the temperature determination device is in a position to determine the temperatures of adjacent or further successive other hydraulic components. For this reason it would not be necessary to always thermally simulate the entire hydraulic system and to determine all the established temperatures on the basis of such simulation. With the support from actually acquired temperatures it would be sufficient to thermally simulate the hydraulic components not acquired by temperature sensors. Depending on the design and characteristics this may take place by means of a simplified linearized algorithm or merely by direct forward projected calculation by means of an equation, and consequently, starting from the acquired temperature, the temperatures of discrete fluid volumes in all the remaining hydraulic components may be determined by calculation. Merely as an example it should be stated that a hydraulic fluid line may, for example, cause a substantially linear temperature gradient, so that in a cooler environment the temperature of a heated hydraulic fluid conveyed through a hydraulic fluid line decreases in a substantially linear manner. In contrast to this, heat exchangers usually cause a sudden temperature change, while pumps or other power-introducing means usually result in sudden heating of the hydraulic fluid.

According to various exemplary embodiments of the present disclosure, a method is also provided. The method generally comprises determining a temperature of hydraulic components; determining an increase in ageing of the respective hydraulic components for an observation period; and aggregating overall ageing of all the hydraulic components over the entire duration of a flight mission.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
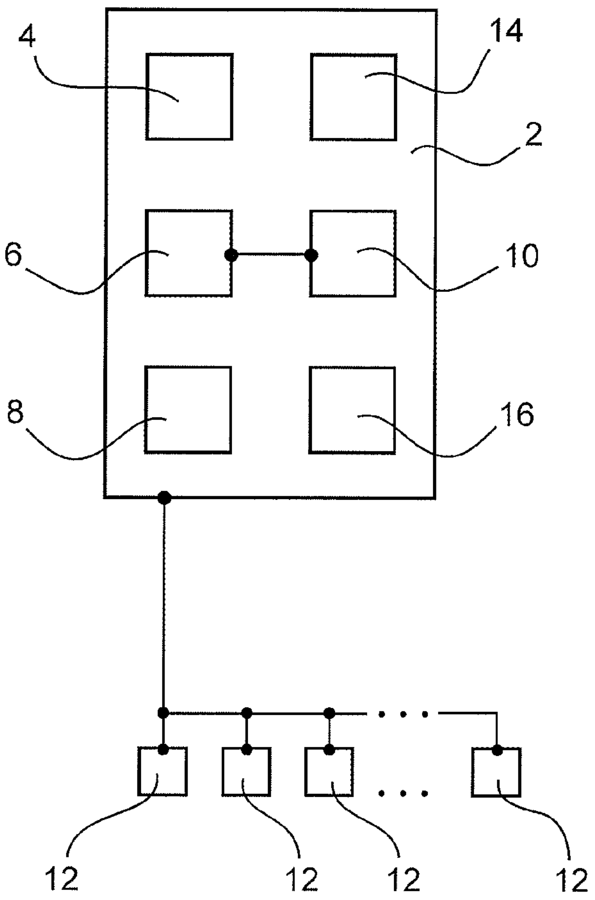
FIG. 1 shows an exemplary embodiment of a device according to the various teachings of the present disclosure.

FIG. 1 shows a block diagram of a first exemplary embodiment of a device according to the present disclosure.

Shown is a calculation unit 2 that comprises an ageing determination device 4 and a temperature determination device 6. These two devices 4 and 6 may be designed as a separate hardware component, or may be an integral part of the calculation unit 2.

The calculation unit 2 may, furthermore, comprise a database 8 in which significant parameters of a hydraulic system (not shown in FIG. 1) to be monitored are provided. In this arrangement the database 8 may comprise information about all the hydraulic components of the hydraulic system to be monitored, for example a complete representation of a hydraulic equivalent circuit diagram comprising hydraulic components in the form of lines, valves, junctions, pumps, actuators, motors and the like. The technical parameters relevant to the device according to the present disclosure generally comprise thermal parameters that are directed to thermal resistance and the like of the hydraulic components so that with the knowledge of a perceived heat flow of a respective hydraulic component and the knowledge of an ambient temperature the resulting temperature of a discrete fluid volume may be determined.

The database 8 may furthermore comprise information about performance parameters of hydraulic components, for example, the maximum possible output of a hydraulic pump and its efficiency, in this manner making it possible to calculate a resulting heat flow based on losses, and finally making it possible to determine the temperature of the discrete fluid element. Furthermore, the database 8 may comprise parameters for heat exchangers that cause sudden temperature changes within a hydraulic system depending on a coolant medium supplied from the outside.

The temperature determination device 6 may be adapted for carrying out numerical simulation, on a component-by-component basis, of the hydraulic system to be observed. This means that in the temperature determination device a simulation environment is provided in which the simulation of hydraulic components takes place in a substantially linear or non-linear form. As an alternative to simulation, interpolation may take place from a multi-dimensional dataset that represents characteristic curves recorded by experimental measuring.

In complex hydraulic systems of modern vehicles the significant hydraulic components are controlled by electrical analog or digital signals that may also be transmitted to the calculation unit 2 in order to be used by the simulated hydraulic system. The state variables resulting in the simulated hydraulic system depending on the aforesaid, make it possible for the temperature determination device 6 to determine the resulting temperatures of the individual hydraulic components. An interface device 10 may be used for transmitting these control signals to the simulated hydraulic system.

As an alternative or in addition to the aforesaid it would be possible to support the numerical simulation, carried out on a component-by-component basis, of the hydraulic system to be monitored by measured variables that are based on measurements from the real hydraulic system. To this effect it may make sense to affix a multitude of temperature sensors 12 on the hydraulic system to be monitored at various locations comprising significant hydraulic components in order to, based on the temperature values determined in those locations, determine the temperatures in other hydraulic components, for example downstream hydraulic components, by simulation. It may, for example, make sense to equip a hydraulic reservoir, and at the same time outlet lines of hydraulic pumps and connecting lines between individual strands of a larger hydraulic system, with a temperature sensor.

In a reservoir there is usually quite a large percentage of the total volume of the hydraulic fluid of the hydraulic system to be monitored. In all the subsequent pipelines that are connected to the reservoir, depending on the ambient temperature of the hydraulic system, the temperature is changed in an generally linear manner; for example, the temperature of the hydraulic fluid in a hydraulic line following on from a reservoir decreases in a substantially linear manner in a cooler environment. The same applies to pipelines that follow on from an outlet connection of a hydraulic pump in which the highest temperatures are to be expected. It is thus the objective in such an approach to arrange the temperature sensors 12 at generally as relevant locations as possible within the hydraulic system, in which locations, for example, the highest temperatures and/or the largest volume of hydraulic fluid are to be expected. By means of simulation component by component the temperatures of the discrete fluid volumes in the downstream hydraulic components may be supplemented by means of the temperature determination device 6.

The ageing determination device 4 is connected to the temperature determination device 6 and is equipped to determine ageing of a discrete fluid volume based on the temperature of this respective fluid volume in that according to the following equation the maximum expected service life $L_{max}$ of the hydraulic fluid at the determined temperature of the discrete fluid volume $V_k$ over an observation period $\Delta t_m$ is determined:

$$D = \frac{V_k \cdot \Delta t_m}{V \cdot L_{max}(T_m)}$$

This ageing increment may be determined in relation to all m discrete fluid volumes. For an observation period thus an ageing increment of the entire hydraulic fluid results:

$$D = \frac{1}{V} \sum_{k,m} \frac{\Delta t_m V_k}{L_{max}(T_{k,m})}$$

If, in a hydraulic system to be monitored, stationary operation is to be expected in which in the individual hydraulic components stationary temperatures are set, measuring is generally necessary at relatively coarse intervals so that the observation periods $\Delta t_m$ may be selected to be correspondingly long. This applies, for example, to the case where the vehicle in question is a commercial aircraft that is in a cruising phase for several hours with no or generally very slight and thus negligible control movements taking place. The ambient temperature of significant components of the hydraulic system is to be regarded as being stable, the loads in the hydraulic system are to be regarded as being constant, and correspondingly the expected temperatures of the discrete fluid volumes over very large periods of time are to be regarded as being constant.

It goes without saying that especially during the approach to landing with continuously rising ambient temperatures and constant control movements, and during the ascent to cruising altitude with continuously falling ambient temperatures and possibly constant control movements the observation periods should be reduced to a reasonable measure.

For the sake of completeness it should be mentioned that the calculation unit 2 may also comprise a storage unit 14 by means of which data may be stored temporarily or permanently, which data is required for operation of the ageing determination device 4 and for the temperature determination device 6.

Furthermore, the calculation unit 2 can comprise a further interface 16 by means of which ageing of the hydraulic fluid can be communicated to other systems and display units.

Figure 2:
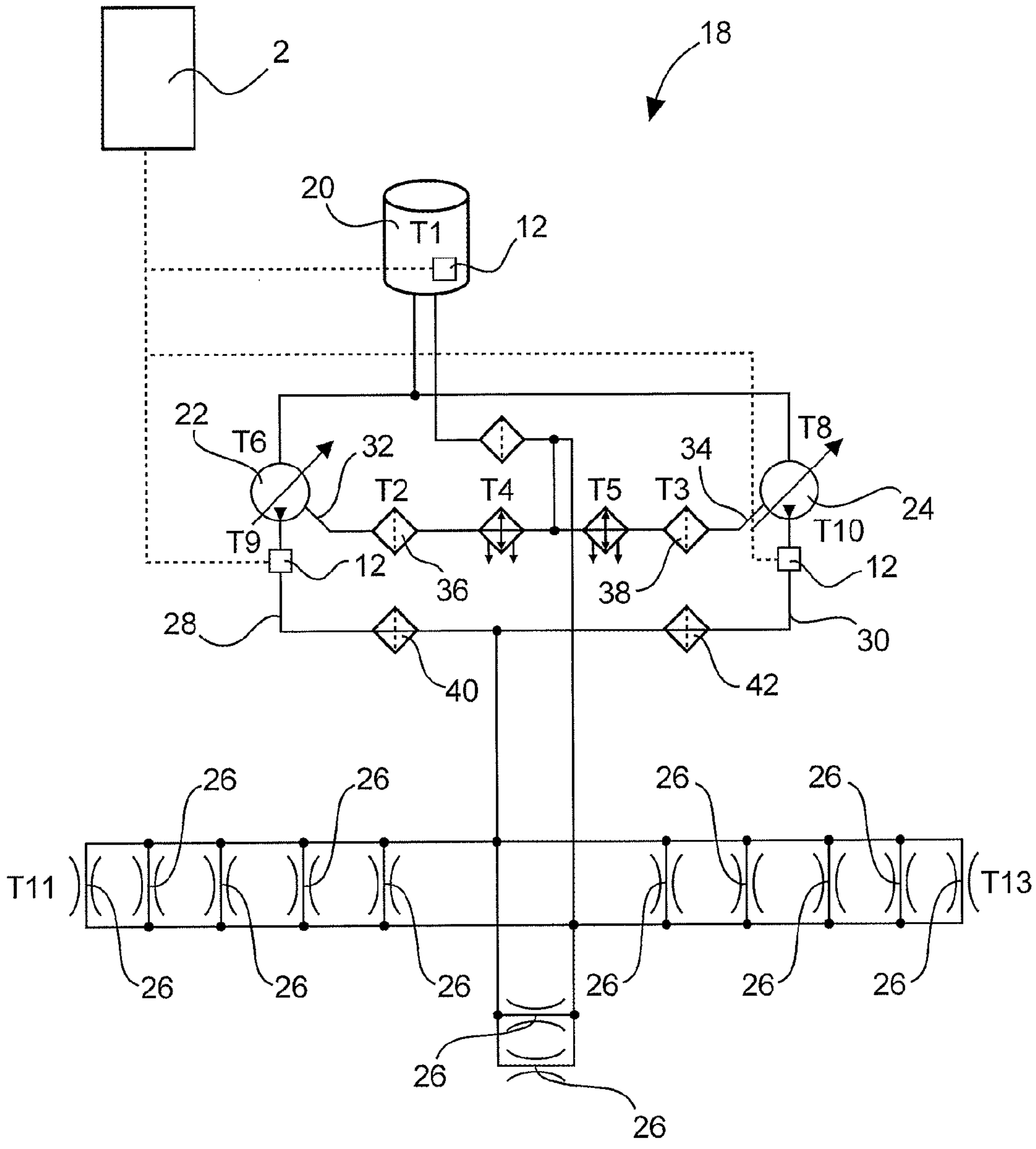
FIG. 2 shows an exemplary aircraft hydraulic system that is being monitored by means of the device according to the various teachings of the present disclosure.

FIG. 2 shows an exemplary hydraulic system 18 that uses a hydraulic fluid that may be monitored for ageing by means of a device according to the present disclosure with a calculation unit 2. Overall, the hydraulic system 18 comprises a reservoir 20, a pump 22 and a pump 24 that are in communication with consumers 26.

In a modern aircraft already a relatively large number of temperature sensors 12 are used in order to detect states during operation or the like. Normally these temperature sensors 12 are located on the reservoir 20, on outlet lines 28 and 30 of pumps 22 and 24, or on leakage lines 32 and 34 of the pumps 22 and 24, for example in filters 36, 38, 40 and 42 arranged downstream. Accordingly, for example in the hydraulic system 18 shown, three different temperature values may be determined at any particular time so that all the correspondingly following hydraulic components with their known heat load behaviors may be simulated in order to determine the temperatures of the discrete fluid volumes of the hydraulic fluid contained therein.

Figure 3:
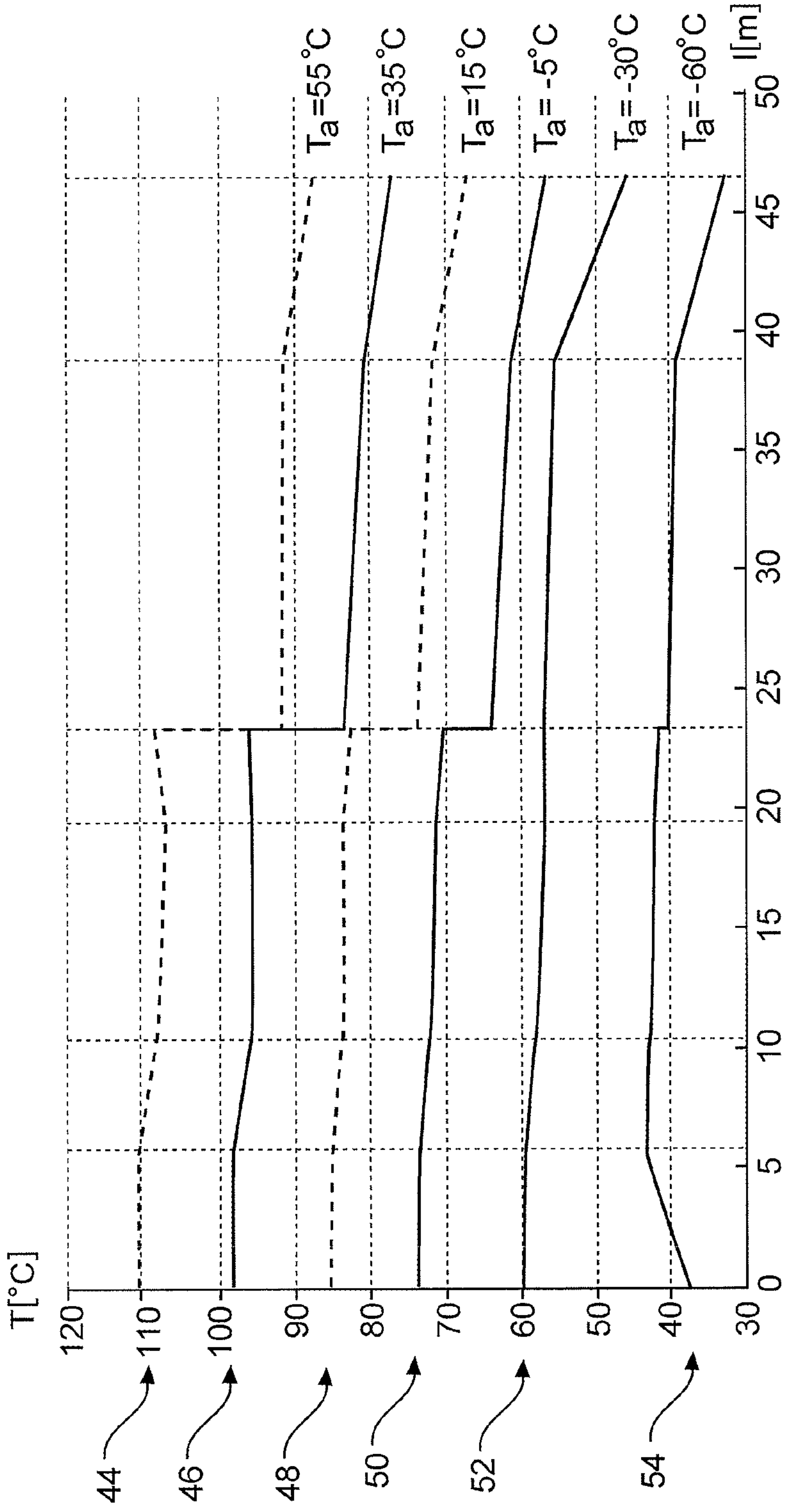
FIG. 3 shows a temperature profile for a sequence of a hydraulic system at different ambient conditions.

FIG. 3 diagrammatically shows several temperature profiles shown in a shared diagram, which are destined for exemplary hydraulic components and depending on various ambient temperatures are shown one on top of the other.

The uppermost line 44 in the drawing plane commences at a line length of 0 meters and at a fluid temperature of 110° C. At this location, for example, a pump may be arranged in which electrical power is converted to hydraulic power and because of the limited efficiency of such an arrangement a relatively high fluid temperature arises. It should be pointed out that this curve 44 applies to an ambient temperature of 55° C., which corresponds to a hot day on the ground.

In line with the line length the fluid temperature is approximately constant to a line length of 6 meters, and then falls in a substantially linear manner in two different gradients to a line length of about 19 meters because the heated hydraulic fluid gives off its heat to the environment. At a line length of about 24 meters the heated hydraulic fluid reaches a heat exchanger where it gives off heat relatively suddenly so that a temperature decrease to approximately 91.5° C. takes place. Finally, the temperature remains relatively constant and slightly decreasing to a line length of approximately 39 meters before finally attaining a temperature of about 87° C. in a reservoir.

A further curve 46, situated underneath the aforesaid, is relatively similar, wherein the gradients of the sections dropping in a substantially linear manner differ, which may be explained by a somewhat lower ambient temperature of about 35° C.

All the further curves 48, 50, 52 and 54 situated below the above are similar in their shapes but more or less pronounced, which may be explained by the different ambient temperatures of about 15° C. (curve 48), about −5° C. (curve 50), about −30° C. (curve 52) and about −60° C. (curve 54).

From this graph the average person skilled in the art recognizes that each hydraulic component causes a characteristic temperature gradient that depends on the design of the hydraulic component. Pipelines tend to give off heat or take up heat along their line length, depending on the temperature gradient between the temperature of the hydraulic fluid and the external temperature. In the case of hydraulic pumps (for example 22 and 24) a fluid temperature is attained that in an observed hydraulic system 18 or in a hydraulic system 18 to be monitored represents one of the highest temperatures. Heat exchangers cause a sudden heat outflow or inflow, which results in a sudden change in temperature.

With these assumptions the calculation unit 2 and in one example, the temperature determination unit 6 is in a position, with relatively simple numerical models of hydraulic components, depending on a few measured temperatures within a hydraulic system 18, to determine the fluid temperatures of various discrete fluid volumes so that for an overall hydraulic system 18 the temperature of each discrete fluid volume may be determined so that complete determination of ageing of the hydraulic fluid can take place. This does not necessitate the creation of complex non-linear simulation models for individual hydraulic components; instead, linearized simulation models may be used that lead to meaningful results.

Figure 4:
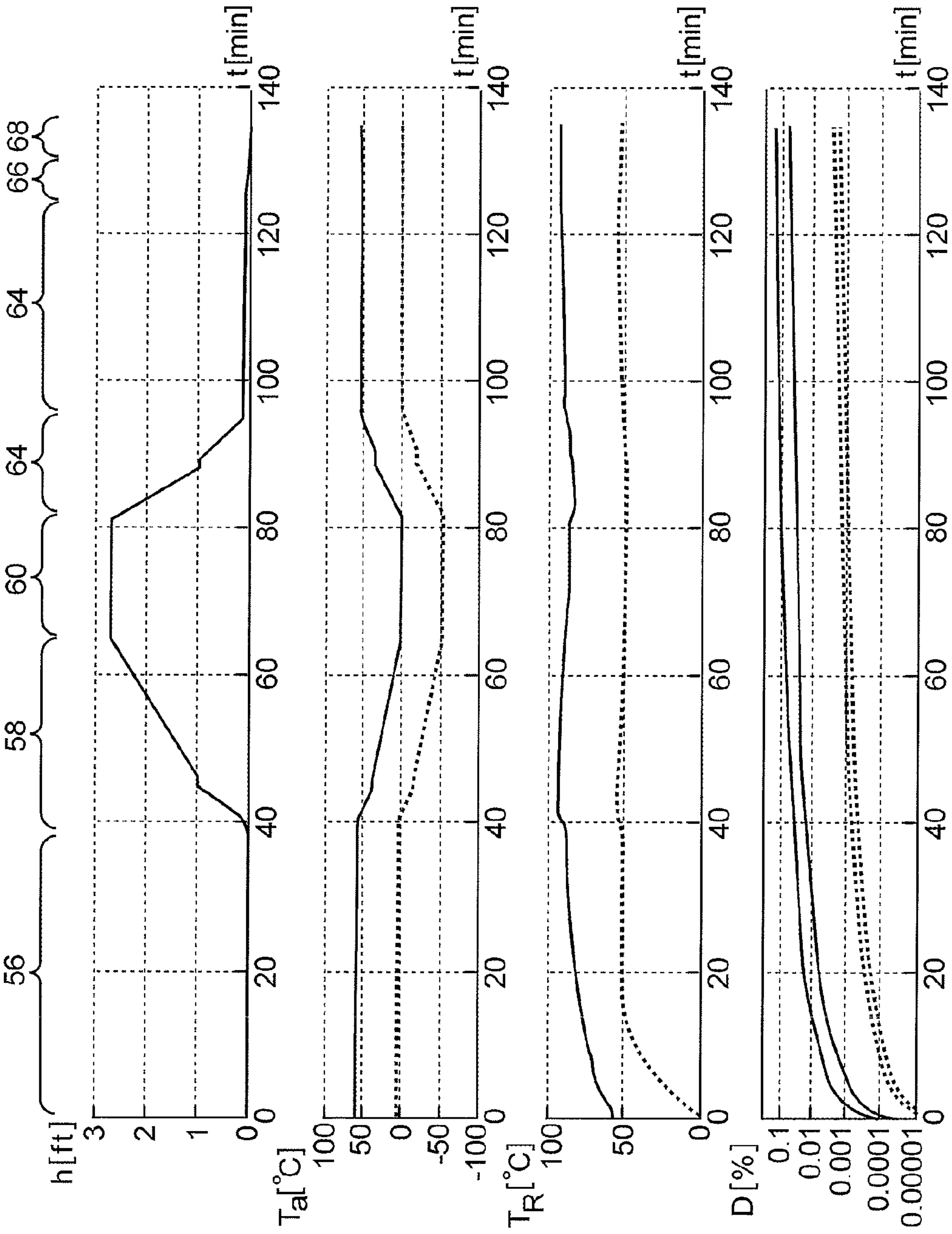
FIG. 4 shows an increase in ageing of a hydraulic fluid depending on a flight mission.

In order to better illustrate the increase in ageing of a hydraulic fluid depending on a flight mission carried out, FIG. 4 shows four different diagrams, arranged one above the other, wherein the uppermost diagram depending on the flight time in minutes indicates the flight altitude; the diagram below indicates the ambient temperature; the diagram below it indicates the temperature within the hydraulic reservoir; and the bottom graph indicates ageing in percent.

In a typical flight mission, first a taxiing phase 56 occurs in which the flight altitude is about 0, the ambient temperature in a first example is about 55° C. and in a second example is about 0° C. The reservoir temperature of the hydraulic fluid may correspondingly slowly rise during the taxiing phase 56 from about 55° C. or from about 0° C. to a higher value, which at first results in a significant rise in ageing in percent. During the ascent phase 58 the ambient temperature drops to almost about 0° C. in the first example, and to about −50° C. in the second example, and remains substantially constant during the cruising phase 60. Ageing rises less pronouncedly during the ascent phase 58; the derivation of the ageing curve is substantially 0. In a descent phase 62, a holding phase 64, an approach phase 66 and a subsequent taxiing phase 68 the ambient temperature rises slowly, however, the hydraulic reservoir temperature remains generally constant. Ageing, too, changes generally slightly; the derivation of the ageing curve may already be slightly negative.

In FIG. 4 in the bottom graph the ageing curve further shows a difference between a type IV hydraulic fluid with a water content of about 0.5%; further below it a type V fluid with a water content of about 0.2%. This shows that depending on the physical parameters of the hydraulic fluid there is a different ageing curve so that, for example, a type V fluid ages to a lesser extent than does a type IV fluid.

Figure 5:
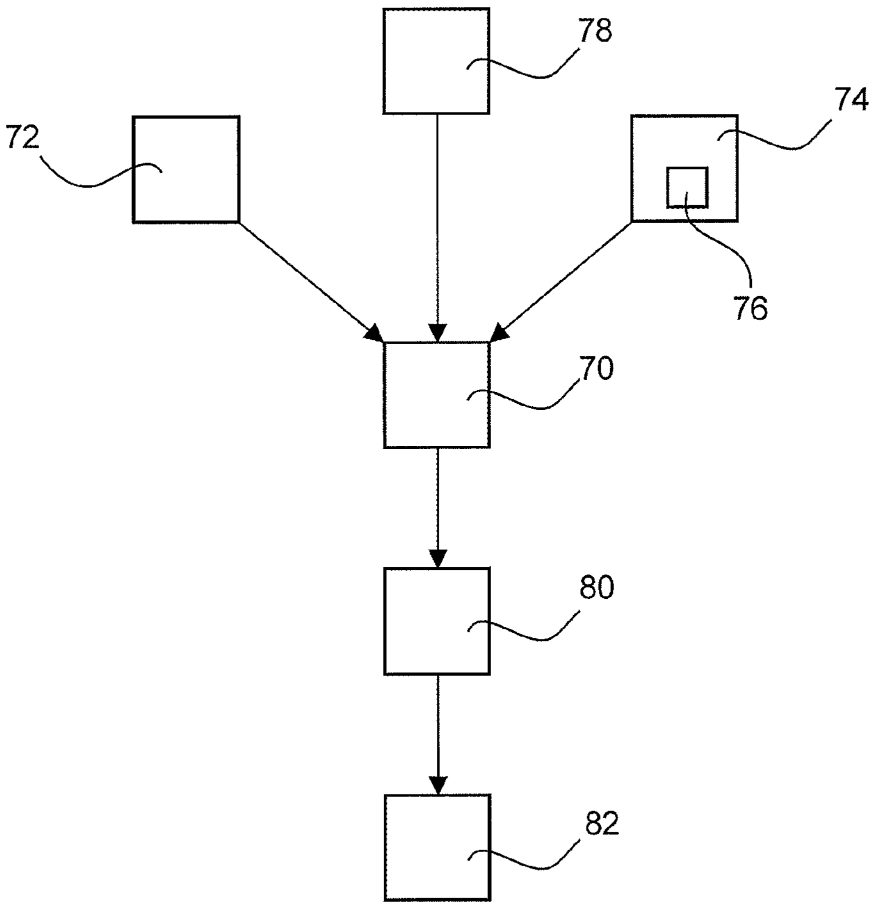
FIG. 5 shows a method according to the various teachings of the present disclosure.

FIG. 5 shows a method according to the present disclosure for determining the state of ageing of a hydraulic fluid of a hydraulic system of a vehicle. Generally, this method comprises determining 70, component by component, the temperature of a discrete fluid volume within a hydraulic component. This may involve measuring 72 at least one temperature of a discrete fluid volume in at least one hydraulic component, and carrying out 74 a thermal simulation of the discrete fluid volume within at least one hydraulic component whose temperature cannot be measured. This may involve calculating 76 a fluid outlet temperature depending on a fluid inlet temperature. Furthermore, the method according to the present disclosure involves generating 78 an observation period depending on an operating state of the vehicle. In an unsteady operating state that requires very considerable output or load changes of the hydraulic system shorter observation periods are to be regarded as more advantageous, while in steady, stationary operation longer observation periods are adequate.

In relation to each discrete fluid volume an increase in ageing is determined 80; subsequently, in relation to at least one observation period all the increases in ageing of all the discrete fluid volumes are aggregated 82.

Determining the temperature is carried out in relation to all the hydraulic components of the hydraulic system under consideration so that all the discrete fluid volumes within the entire hydraulic system have been taken into account and all the temperatures of all the discrete hydraulic fluid volumes at the particular observation period have been determined.

Figure 6:
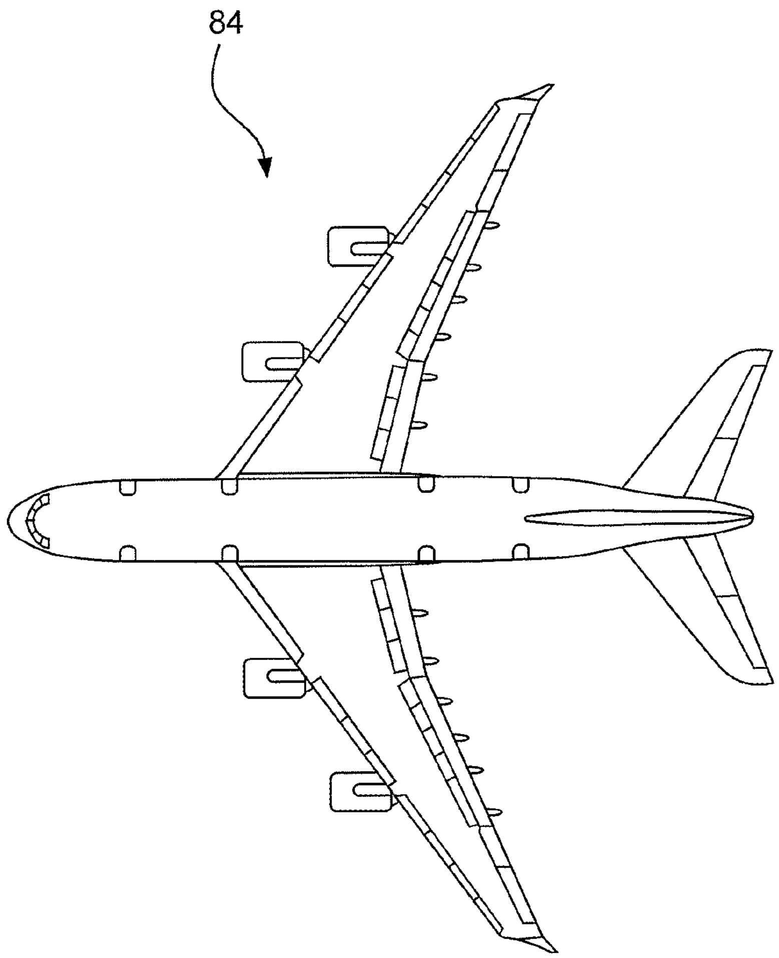
FIG. 6 shows an aircraft comprising at least one device according to the various teachings of the present disclosure.

Finally, FIG. 6 shows an aircraft 84 comprising at least one device for determining the state of ageing of a hydraulic fluid of a hydraulic system of the aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for determining ageing of a hydraulic fluid in a hydraulic system with a multitude of hydraulic components, comprising:

at least one temperature determination device that determines the respective temperature of each discrete fluid volume of the hydraulic fluid in the hydraulic system; and at least one ageing determination device that determines an increase in ageing of the hydraulic fluid from the following equation:

$$D = \frac{V_k \cdot \Delta t_m}{V \cdot L_{max}(T_m)}$$

wherein D is the ageing of the hydraulic fluid, $L_{max}$ denotes a maximum service life of the hydraulic fluid at the temperature $T_{,m}$, $\Delta t_m$ denotes an observation period, and $V_k$ denotes the volume of the discrete fluid volume.

2. The device of claim 1, further comprising a calculation unit that determines, from the respective increases in ageing of the discrete fluid volumes over a predetermined duration, the entire increase in ageing of the hydraulic fluid contained in the hydraulic system.

3. The device of claim 1, wherein the temperature determination device carries out a numerical thermal simulation, component by component, and determines at least one temperature of at least one hydraulic component of the hydraulic system.

4. The device of claim 3, wherein the numerical thermal simulation determines a heat flow relating to at least one discrete fluid volume of the respective hydraulic component relative to the environment of the hydraulic component.

5. The device of claim 3, wherein the temperature determination device further comprises an interface device that is connectable to a control unit of the hydraulic system that simulates loads of hydraulic components in the numerical thermal simulation.

6. The device of claim 3, wherein the temperature determination device is connectable to at least one ambient temperature sensor and acquires the ambient temperature of at least one hydraulic component by means of the ambient temperature sensor.

7. The device of claim 3, wherein the temperature determination device is connectable to at least one temperature sensor and acquires the temperature of a discrete fluid volume of the hydraulic fluid in a respective hydraulic component, and based on the numerical thermal simulation module of the hydraulic system determines the temperatures of hydraulic components whose temperature is not monitored.

8. The device of claim 1, wherein the hydraulic fluid is in the hydraulic system of an aircraft.

9. A method for determining ageing of a hydraulic fluid in a hydraulic system of a vehicle comprising a multitude of hydraulic components, comprising:

determining, by a calculation unit, the temperature of a discrete fluid volume within at least one hydraulic component;

generating, by a calculation unit, an observation period based on an operating state of the vehicle;

determining an increase in ageing of a respective discrete fluid volume by means of the ageing determination device using the following equation:

$$D = \frac{V_k \cdot \Delta t_m}{V \cdot L_{max}(T_m)}$$

wherein D is the ageing of the hydraulic fluid, $L_{max}$ denotes a maximum service life of the hydraulic fluid at the temperature $T_{,m}$, $\Delta t_m$ denotes the observation period, and $V_k$ denotes the volume of the discrete fluid volume; and aggregating all the determined increases in ageing to form an overall increase in ageing of at least one observation period.

10. The method of claim 9, further comprising:

measuring the temperature of at least one discrete fluid volume within at least one hydraulic component by means of a temperature sensor.

11. The method of claim 9, further comprising:

carrying out a thermal simulation of at least one discrete fluid volume within at least one hydraulic component whose temperature is not monitored.

12. An aircraft, comprising:

at least one hydraulic system that includes a hydraulic fluid;

at least one temperature determination device that determines the respective temperature of each discrete fluid volume of the hydraulic fluid in the hydraulic system;

at least one ageing determination device that determines an increase in ageing of the hydraulic fluid from the following equation:

$$D = \frac{V_k \cdot \Delta t_m}{V \cdot L_{max}(T_m)}$$

wherein D is the ageing of the hydraulic fluid, $L_{max}$ denotes a maximum service life of the hydraulic fluid at the temperature $T_{,m}$, $\Delta t_m$ denotes an observation period, and $V_k$ denotes the volume of the discrete fluid volume; and a calculation unit that determines, from the respective increases in ageing of the discrete fluid volumes over a predetermined duration, the entire increase in ageing of the hydraulic fluid contained in the hydraulic system of the aircraft, wherein the specified observation period is generated based on a phase of flight of the aircraft.

13. The aircraft of claim 12, wherein the temperature determination device carries out a numerical thermal simulation, component by component, and determines at least one temperature of at least one hydraulic component of the hydraulic system.

14. The aircraft of claim 13, wherein the numerical thermal simulation determines a heat flow relating to at least one discrete fluid volume of the respective hydraulic component relative to the environment of the hydraulic component.

15. The aircraft of claim 13, wherein the temperature determination device further comprises an interface device that is connectable to a control unit of the hydraulic system that simulates loads of hydraulic components in the numerical thermal simulation.

16. The aircraft of claim 13, wherein the temperature determination device is connectable to at least one ambient temperature sensor and acquires the ambient temperature of at least one hydraulic component by means of the ambient temperature sensor.

17. The aircraft of claim 13, wherein the temperature determination device is connectable to at least one temperature sensor and acquires the temperature of a discrete fluid volume of the hydraulic fluid in a respective hydraulic component, and based on the numerical thermal simulation module of the hydraulic system determines the temperatures of hydraulic components whose temperature is not monitored.

18. The aircraft of claim 13, wherein the specified observation period in an ascent to cruising altitude phase is shorter than the specified observation period in a cruising phase.

* * * * *